United States Patent Office 3,284,288
Patented Nov. 8, 1966

3,284,288
PESTICIDES AND PRODUCTION THEREOF
Klaus Sasse, Cologne-Stammheim, Richard Wegler, Leverkusen, Bernhard Homeyer, Opladen, and Paul-Ernst Frohberger, Burscheid, Bezirk Dusseldorf, Germany, assignors to Farbenfabriken Bayer Aktiengesellschaft, Leverkusen, Germany, a corporation of Germany
No Drawing. Filed Feb. 10, 1965, Ser. No. 431,731
3 Claims. (Cl. 167—22)

The present invention is a continuation of Serial No. 52,756, filed August 30, 1960, now abandoned and relates to a method of protecting plant life against crop pests such as nematodes, insects, and also against fungi.

For purposes of the present invention active amounts of haloalkylrhodanides having the following formula (I) 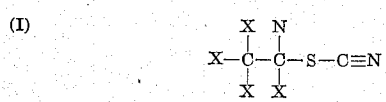

in which at least two X's stand for halogen whereas the other group X may be halogen, hydrogen or generally organic radicals, are applied to the plant being protected or admixed with the soil.

While it is known from German Patent 1,019,123 that aliphatic rhodano-compounds exhibit nematicidal activity, the substituted compounds named in this patent are not sufficiently active in the soil to find practical usage as nematicidal agents.

It is further known from German Patent 956,549 and U.S. Patents 2,650,240 and 2,722,478 that trichloromethylthiocyanate also exhibits fungicidal, nematical and insecticidal properties. For practical purposes, however, several disadvantages limit the use of this compound. In the first place it adversely effects the mucous membranes and the eyes. Furthermore, trichloromethylthiocyanate is sufficiently effective only if employed in a quantity of 0.8 cm.³ per liter soil (approximately 400 p.p.m.) is used. Usual nematicidals such as DD (dichloropropane/dichloropropene), sodium-methyl-dithiocarbamate or others have a satisfactory result if only 50–100 p.p.m. are used. A further disadvantage of trichloromethylrhodanide is a very high phytotoxic effect.

In accordance with the present invention it has now been found that effective protection plus a material reduction in irritant properties can be obtained by the use of a particular group of compounds which can be produced by reaction of the corresponding polyhalogenalkylsulfenic acid-halides with hydrogen cyanide in accordance with the following formula (II) 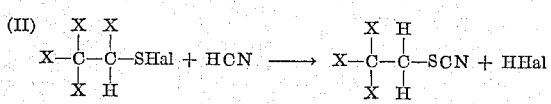

These polyhalogenalkylrhodanides (I) contain at least two carbon atoms in the alkyl-radical.

The reaction of polyhalogenalkylsulfenic acid halides may be carried out with gaseous or liquid hydrogen cyanide. Generally it is practical to add substances which are able to bind the free hydrogen halides. Lower fatty acids like formic acid, acetic or propionic acid in the presence of a salt of these acids have proved to be a very advantageous reaction medium. Solutions of hydrogen cyanide which contain these salts can be obtained by adding alkali-cyanides or alkaline earth-cyanides to an excess of these acids. Another way is to solve gaseous or liquid hydrogen cyanide in a fatty acid and to add a fatty acid salt before, during or after the reaction or to produce the latter by adding an alkali- or alkaline-earth-metal-oxide, -hydroxide or -carbonate of a tertiary amine. The reaction of a polyhalogenalkylsulfenic acid halide with hydrogen cyanide solutions prepared in this way is exothermic. To avoid a loss of hydrogen cyanide it is advisable to work under cooling to room-temperature or less, preferably below 15° C. Since the polyhalogenalkylrhodanides are soluble in lower fatty acids, they can be isolated by fractional distillation after the unsoluble salts have been removed.

In the following the preparation of the starting materials, namely the polyhalogen-alkylsulfenic acid halides may be described in more detail. By reaction of disulfurdichloride with polyhalogenolefines which contain at least two halogens atoms and at least one hydrogen atom in the presence of a Friedel-Craft-catalyst, partially or exceptionally saturated bis-(polyhalogenalkyl)-disulfides are formed. Especially satisfying yields are obtained if the reaction is carried out below room temperature. These bis-(polyhalogenalkyl)-disulfides can be split with elementary halogens and saturated polyhalogenalkansulfenic acid halogenides are obtained essentially.

This reaction of disulfurdichloride with halogenolefines of the Formula III in which at least two of the radicals represent a halogen atom and the third one represents a halogen atom, too, or a hydrogen atom or an organic group yielding bis-(polyhalogenalkyl)-disulfides (IV) proceeds according to the following formulae

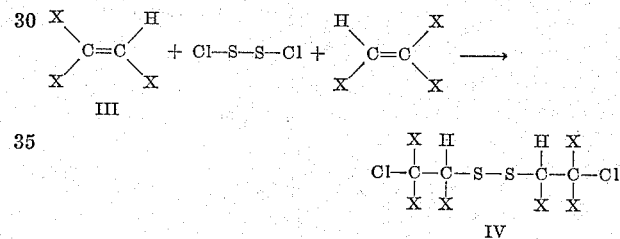

In this manner there are obtained e.g. the bis-(1,2,2,2-tetrachloroethyl)-disulfides from the trichloroethylene and the bis-(2,2,2-trichloroethyl)-disulfide from the 1,1-dichloroethylene.

Exceptions are olefines which contain one hydrogen atom and halogen atom each on both carbon atoms of the ethyl-bond, as the 1,2-dichloroethylene. Therefrom there are obtained under the influence of disulfurchlorides simultaneously the corresponding bis-(polyhalogenalkyl)-monosulfides (V) and -disulfides (VI) in about the same proportion. Whether the monosulfides in this reaction are formed directly or by intermediate products of the Formula VII and whether sulfur is either produced elementary or in the form of polysulfides is without importance for the end products. Sulfur at least is missing in the distillable products.

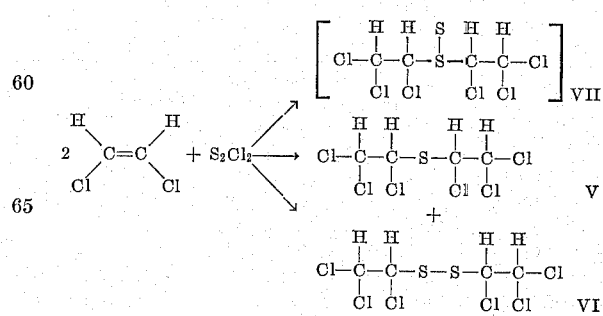

This addition-reaction proceeds at lower temperatures under slight chlorohydrogen-development so that there are only very small quantities of unsaturated disulfides of the Formulae VIII and IX

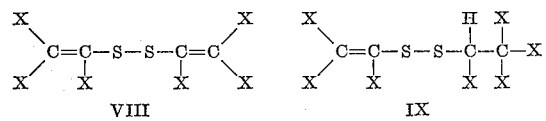

This reaction in practice is carried out reacting one mol of disulfurdichloride gradually with two mols of polyhalogenolefines under room temperature, preferably below 0° C. in the presence of a Friedel-Craft-catalyst. Principally it is without importance whether the disulfurdichloride is produced togethed with the catalyst and then the polyhalogenolefine is added, or whether the polyhalogenolefines and the catalyst are produced and the disulfurdichloride added in portions. The first way sometimes is more useful because some polyhalogenolefines decompose at low temperatures under the influence of a catalyst under polymerisation or polycondensation.

Anhydrous aluminumchloride, ironchloride, tinchloride and the like are especially suitable as Friedel-Crafts-catalysts. To effect the reaction only very small quantities of the catalysts are needed, e.g. $\frac{1}{100}$ mol of aluminumchloride( referred to disulfurdichloride), but to result a quick reacting it is mostly advisable to use about $\frac{1}{10}$ mol. If the reaction is carried out under sufficient cooling, it is not necessary to use a diluent. On the other hand the presence of an inert solvent, such as aliphatic or hydroaromatic hydrocarbon most times would be advisable. It is also possible to proceed the reactions in an excess of polyhalogenolefine.

The bis-(polyhalogenalkyl)-disulfides are distillable in vacuo. At higher temperatures partially hydrogen-halide splits off and occasionally disproportion-action to monosulfides and trisulfides takes place. Therefore the distillates are not always uniform if the fractionating was not sufficient. Also there are usually residues which are not distillable. In order to increase the yield of saturated polyhalogenalkansulfenic acid halides it has proved to be useful to split the crude bis-(polyhalogenalkyl)-disulfides.

The reaction of elementary halogens, especially chlorine or bromine on bis-(polyhalogenalkyl)-disulfides principally proceeds according to the following equation.

to separate from the sulfenic acid halogenides because of their much higher boiling point.

The halogenation-reaction may be carried out without diluents. But it also immediately proceeds at room temperature or slightly above in diluents such as carbon tetrachloride, chloroform or similar ones if small quantities of iodine are added to the raction-mixture as catalysts. The best way of carrying out the reaction is the following procedure: the addition-products of disulfurdichlorides and polyhalogenolefines are decanted from the catalysts as well as from the decomposed resin-like parts, if necessary they are filtered. About the same quantity of carbon tetrachloride or chloroform are added and after an addition of a few crystals of iodine the mixtures is chlorinated or brominated, preferably at 25–35° C. There is obtained by fractional distillation the polyhalogenalkyl sulfenic acidhalide in a sufficient pure form.

The polyhalogenalkylrhodanides which can be produced from the before mentioned halogenides possess an extraordinary wide biocidal action against nematodes, insects and fungi which makes these compounds useful as insecticides in various ways.

To test the nematicidal action polyhalogenalkylrhodanides were mixed in various quantities with 5 liters each of soil infested by nematodes and kept in pots for one week. Thereafter tomatoes and beets were planted therein. After further 5 weeks the roots of the plants were examined whether they had been attacked by nematodes. It has been found that by use of 1,2,2,2-tetrachloroethylrhodanide in a quantity of 40 p.p.m. root-gall-nematodes (Meloidogyne) and in a quantity of 50 p.p.m. potato nematodes (Hetorodora) were absent. The 2,2,2-trichloroethyl-rhodanide effected a complete killing of both nematode kinds in a concentration of 300 p.p.m. but plants which were grown on soil treated with trichloromethylrhodanide showed a heavy nematode attack in a concentration of 300 p.p.m. as heavy as the control plants.

The compounds are especially valuable since they are highly active, too, against soil fungi. Comparative tests have shown that the 1,2,2,2-tetrachloroethylrhodanide is better than several standard-agents which only act specifically against special fungi.

SOIL-TREATMENT AGAINST PHYTOPATHOGENIC FUNGICIDES
[Host-plant: Pea]

| Preparation | Active ingredient in p.p.m. | Number of healthy plants in percent 3 weeks after sowing | | |
|---|---|---|---|---|
| | | Test I.—*Pythium ultimum*, natural infestation | Test II.—*Fusarium culmorum*, artificial infestation | Test III.—*Rhizoctonia solani*, artificial infestation |
| Untreated | | 4 | 0 | 0 |
| Sodium salt of p-dimethylamino-phenyl diazo-sulfonic acid (for comparison) | 5 | 51 | | |
| | 25 | 67 | | |
| | 100 | 69 | | |
| Phenylmercuric acetate (PMA) 2.2% Hg 2:1000 treated (for comparison) | | | 75 | |
| Methylarsinsulfide (for comparison) | 5 | | | 0 |
| | 25 | | | 90 |
| | 100 | | | 90 |
| 1,2,2,2-tetrachloro-ethylrhodanide | 5 | 2 | 50 | 65 |
| | 25 | 26 | 65 | 100 |
| | 100 | 92 | 20 | 100 |
| | 200 | 94 | | |

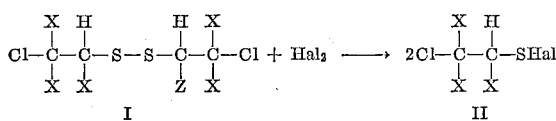

In the Formulae X and XI the radicals X have the aforementioned significance.

If the crude addition products of disulfurdichloride and polyhalogenolefine which can contain bis-(polyhalogenalkyl)-disulfides are immediately halogenated, only the first are split to sulfenic acid halides. The unchanged remaining bis-(polyhalogenalkyl)-monosulfides are easily A special advantage of the polyhalogenalkylrhodanides is their non-phytotoxicity. Young bean-plants which were treated with 0.1% solutions of 1,2,2,2-tetrachloroethylrhodanide showed no damages or influence to their growth.

The highly fungicidal action, which is exhibited by the polyhalogenalkylrhodanides can be seen from the fact that 1,2,2,2-tetrachloroethylrhodanide stops the germination of spore sof *Phytophtora infestans* and of Fusicladium completely, in a concentration of 0.0001%. The same compound also protects rye from any fungicidal attack if it is used as a 0.3% spray.

Furthermore, the polyhalogenalkylrhodanides can be used to kill insects. Flies and gnats were killed completely within 15 minutes (filterpaper-test) with a 0.1% solution of the 1,2,2,2-tetrachloroethylrhodanide. Also cockroaches, crickets and fly-larvae were killed completely under similar conditions.

The use of the inventive polyhalogenalkylrhodanides as insecticides and plant protecting agents can be carried out in the usual way, i.e. in the form of solutions, emulsions and the like. Addition of liquid or solid inert substances is sometimes advisable. The presence of suitable emulsifiers especially when using water as a diluent, may be advisable, too. Further it is possible to use such preparations in mixture with other insecticidal, fungicidal, nematicidal or bactericidal active substances.

*Example 1*

13 g. of potassium cyanide are added in portions while stirring to 50 cm.$^3$ of glacial acetic acid at a temperature of 10–15° C. Thereafter 46.9 g. of 1,2,2,2-tetrachloroethanesulfenic acid chloride are added dropwise while cooling below 10° C. Stirring is continued for one hour below 10° C. and another hour at room temperature. Then the potassium-chloride is separated by filtration and the filtrate is fractionated. At a B.P.$_{14}$ 117–123° C. 24 g. of 1,2,2,2-tetrachloroethylrhodanide of the formula $CCl_3$—$CHCl$—$SCN$ distil over.

*Example 2*

To a reaction mixture consisting of 13 g. potassium cyanide in 50 cm.$^3$ glacial acetic acid as described in Example No. 1 40 g. of 2,2,2-trichloroethanesulfenic acid chloride are added dropwise at a temperature below 10° C. The 1,2,2-trichloroethylrhodanide of the formula $CHCl_2$—$CHCl$—$SCN$ distils at a B.P.$_{15}$ 116° C.

*Example 3*

To a reaction mixture consisting of 13 g. potassium cyanide in 50 cm.$^3$ glacial acetic acid as described in Example No. 1 40 g. of 2,2,2-trichloroethylsulfenic acid chloride are added dropwise at a temperature below 10° C. After one hour's stirring at 10° C. and later at room temperature the potassium chloride is filtered with suction and from the filtrate the glacial acetic acid is distilled off in vacuo. The residue solidifies while cooling. It is recrystallized from ligroine and has a melting point of F: 33–35° C. Yield of pure 2,2,2-trichloroethylrhodanide of the formula $CCl_3$—$CH_2$—$SCN$: 25.5 g.

*Example 4*

291 g. of 1,2-dichloroethene are cooled to 0° C. and mixed with 25 g. finely pulverized anhydrous aluminumchloride. While stirring and cooling with ice-water-sodium-chloride there are added at a temperature below +5° C. 202.5 g. of disulfurdichloride. Stirring is continued for one hour under cooling and one further hour at room temperature, when the mixture is poured into ice water and the oil is taken up in benzene. The benzenic solution is separated, washed twice with water and dried over calciumchloride. Benzene as well as other volatile substances are removed under lower pressure at a water bath temperature of about 75° C. There remain about 450 g. of a light-brownish oil which contain 20.5% of sulfur and 64.5% of chlorine. By fractional distillation of this mixture there are obtained 150 g. (B.P. 135–140° C. (a) and 50 g. of a light-yellow oil, B.P. 145–150° C. (b) respectively. The analyses are:

(a) 13.0% S; 69.8% Cl.
(b) 15.8% S; 67.5% Cl.

Therefore these fractions are mixtures of bis-(1,2,2-trichloroethyl)-disulfide and bis-(1,2,2-trichloroethyl)-monosulfide.

*Example 5*

To a mixture of 40 g. disulfurdichloride and 2 g. pulverized anhydrous aluminumchloride there are added dropwise 60 g. of 1,2-dichloroethene while cooling with ice-water-sodium-chloride at a temperature below +5° C. Stirring is continued for one hour under ice-cooling and one hour at room temperature. Then the mixture is worked up as described in Example 4. There are obtained about 50 g. of an oil boiling at 110–135° C./0.05 mm. which contains similar proportions of ingredients of the products mentioned in Example 4.

*Example 6*

To a suspension of 26.7 g. finely pulverized anhydrous aluminum-chloride in 263 g. trichloroethylene there are added dropwise while stirring and cooling externally with ice-water-sodium-chloride at a temperature below +5° C. 135 g. of disulfurdichloride. Stirring is continued for one hour under ice-cooling and one hour at room temperature. After working up as described in Example 4 there are obtained about 350 g. of an almost colourless oil, which contains 17.1% sulfur and 70.1% of chlorine. By distillation at 105–110° C./0.02 mm. 100 g. (a) and at a B.P. 124–134° C. 140 g. (b) of an almost colourless oil distill over while about 100 g. of an undistillable residue remain. The analysis for these are:

(a) 13.8% S; 72.4% Cl.
(b) 17.1% S; 69.9% Cl.

Fraction (b) is an almost pure bis-(1,2,2,2-tetrachloroethyl)-disulfide and fraction (a) is a mixture consisting of bis-(1,2,2,2-tetrachloroethyl)disulfide and bis - (1,2,2,2-tetrachloroethyl)-monosulfide.

*Example 7*

To a suspension of 27 g. finely pulverized anhydrous aluminum-chloride in 270 g. of disulfurdichloride there are added dropwise while cooling with a mixture of ice-water-sodium-chloride at a temperature below 0° C. 388 g. 1,1-dichloroethylene. Stirring is then continued under cooling for half an hour and for further two hours without cooling. While stirring the reaction mixture is poured into a mixture consisting of 1 liter of benzene and 2 liters of diluted hydrochloric acid. Then the benzenic solution is separated, washed three times with water and dried over calcium chloride. After distilling off the benzene there remain 565 g. of an oily residue. From the distillation of 100 g. of this crude product there are obtained the following fractions:

(a) B.P. $_{1.3}$:112–115° C., 15 g., 16.7% S; 66.8% Cl.
(b) B.P. $_{0.3}$:120–123° C., 30 g., 19.2% S; 65.0% Cl.
(c) B.P. $_{0.2}$:125–155° C., 10 g.
(d) B.P. $_{0.2}$:155–165° C., 10 g., 22.8% S; 62.0% Cl.

There remain about 30 g. residue at a bath-temperature of 210° C. as an undistillable oil. Fraction (b) is according to the analysis-values a pure bis-(2,2,2-trichloroethyl)-disulfide, fraction (a) is a mixture thereof with bis-(2,2,2-trichloroethyl)-monosulfide, (d) a mixture thereof with bis-(2,2,2-trichloroethyl)-trisulfide.

*Example 8*

256 g. of the undistillable addition product of disulfurdichloride and 1,2 dichloroethylene (Example 4) are saturated with chlorine at 20–25° C. without a solvent. A total amount of 63 g. of chlorine are used. Excessive chlorine is removed by blowing in a dry nitrogen stream. There are obtained by distilling (a) 135 g. of 1,2,2-trichloroethanesulfenic acid chloride of the formula $$CHCl_2—CHCl—SCl$$

B.P. $_{12}$:76–83° C. and thereafter (b) 130 g. of pure bis-(1,2,2-trichloroethyl)-monosulfide. B.P. $_{12}$:150–153° C. (11.4% S; 71.6% Cl).

*Example 9*

A solution of 30 g. pure bis-(2,2,2-trichloroethyl)-disulfide (Example 4, fraction b) in 120 cm.$^3$ carbon tetrachloride is chlorinated to saturation in the presence of iodine (catalytic amount) at a temperature of 20–30° C.

Excessive chlorine is removed with a dry nitrogen stream. There are obtained by fractional distillation under low pressure 35 g. (96% of th.) of 2,2,2-trichloroethanesulfenic acid chloride of the formula $CCl_3$—$CH_2$—SCl, B.P.$_{10}$: 68–72° C. (16.3%% S; 70.9% Cl; theroet.: 16.02% S; 70.9% Cl.).

Example 10

80 g. of finely pulverized anhydrous aluminum-chloride are suspended in 810 g. of disulfurdichloride. There are gradually added dropwise 1572 g. of trichloroethene at a temperature below —5° C. to a mixture which was cooled externally by an ice-water sodium-chloride mixture. The reaction mixture is stirred for one further hour under ice-cooling and another 2 hours at room temperature, then it is decanted from solid parts and 2 liters of carbon-tetrachloride are added. Then about 1 g. of iodine is added and without cooling a chlorine stream is introduced. The temperature rises slowly to 35° C. If chlorine is no more absorbed the stream is interrupted and an excess of chlorine is removed by blowing in dry nitrogen. The solution is then fractionated in vacuo. After distilling off carbon tetrachloride and small quantities of the starting materials, at a B.P.$_{10}$: 87–93°, 2552 g. (=91% of th.) (referred to disulfurdichloride) of 1,2,2-tetrachloroethenesulfenic acid chloride of the formula $$CCl_3—CHCl—SCl$$

are obtained.

Example 11

To a suspension of 27 g. of finely pulverized anhydrous aluminum-chloride in 270 g. of disulfurdichloride there are added dropwise while cooling externally with ice-water-sodium-chloride mixture at a temperature of —5° to —10° C. 388 g. of 1,1-dichloroethene. Thereafter the mixture is stirred for half an hour at the same temperature, half an hour at 0° C. and another 2 hours at room temperature. The oil is decanted from the resinous ingredients, then taken up in 700 cm.³ of carbon tetrachloride and after the addition of 0.5 g. of iodine without cooling, a chlorine-stream is introduced. After saturation the excessive chlorine is removed by blowing in dry nitrogen. The yellow to orange coloured clear solution is decanted from resinous ingredients and fractionated in vacuo. At a B.P.$_{10}$: 68–72° C. 704 g. (88% of th.) of the 2,2,2-trichloroethenesulfenic acid chloride of the formula $$CCl_3—CH_2—SCl$$

are obtained.

Example 12

To a suspension of 50 g. of finely pulverized anhydrous aluminum chloride in 405 g. disulfurdichloride 582 g. of 1,2-dichloroethene are added dropwise while cooling externally with ice-water sodium-chloride mixture at —10° to —50°. Stirring is continued for one hour under cooling and for further two hours at room temperature. The light-yellow to light-brown oil is decanted from solid or resinous materials and taken up in 1 liter of carbon tetrachloride. If necessary the solution has to filtered. Then chlorine is added in an excess at a temperature of 25–35° C. after the addition of about 1 g. of iodine. The excessive chlorine is removed by blowing in nitrogen. By fractional distillation there are obtained under lower pressure (a) at a B.P.$_{12}$: 77–83° C., 456 g. (=38% of th.) 1,2,2-trichloroethenesulfenic acid chloride of the formula $CHCl_2$—CHCl—SCl and at a B.P.$_{10}$: 148–153° C., 440 g. (44.5% of th.) bis-(1,2,2-trichloroethyl)monosulfide.

We claim:

1. A method for protecting plants against crop pests comprising applying to the area to be protected an active amount of a compound of the formula $$X-\underset{\underset{X}{|}}{\overset{\overset{X}{|}}{C}}-\underset{\underset{X}{|}}{\overset{\overset{H}{|}}{C}}-S-CN$$

wherein X is a member selected from the group consisting of chloro and bromo.

2. A method for protecting plant crops against fungal infection comprising applying to the locus of infection a fungicidal amount of a compound having the formula $$CCl_3—CHCl—SCN$$

3. A method of protecting plant crops from nematode infections comprising admixing with the soil a nematicidal amount of a compound having the formula $$CCl_3—CHCl—SCN$$

References Cited by the Examiner

UNITED STATES PATENTS

| | | | |
|---|---|---|---|
| 2,650,240 | 8/1953 | Olin | 260—454 |
| 2,722,478 | 11/1955 | Olin | 71—2.7 |

FOREIGN PATENTS

| | | |
|---|---|---|
| 956,549 | 5/1953 | Germany. |
| 1,019,123 | 4/1958 | Germany. |
| 1,098,508 | 2/1961 | Germany. |
| 1,122,724 | 4/1955 | France. |
| 1,270,804 | 7/1961 | France. |

OTHER REFERENCES

Soderback: Ann. der Chem. 443:142–153 (1925).

LEWIS GOTTS, *Primary Examiner.*

SAM K. ROSE, *Assistant Examiner.*